US010817900B2

(12) United States Patent
Pandey

(10) Patent No.: US 10,817,900 B2
(45) Date of Patent: Oct. 27, 2020

(54) METHOD AND APPARATUS FOR DETERMINING AN EFFECTIVENESS OF AN ELECTRONIC ADVERTISEMENT

(71) Applicant: MASTERCARD INTERNATIONAL INCORPORATED, Purchase, NY (US)

(72) Inventor: Anshul Pandey, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 232 days.

(21) Appl. No.: 15/621,109

(22) Filed: Jun. 13, 2017

(65) Prior Publication Data

US 2017/0372355 A1  Dec. 28, 2017

(30) Foreign Application Priority Data

Jun. 23, 2016  (SG) .............................. 10201605202T

(51) Int. Cl.
*G06Q 30/02* (2012.01)
*G06Q 10/10* (2012.01)

(52) U.S. Cl.
CPC ....... *G06Q 30/0246* (2013.01); *G06Q 10/107* (2013.01); *G06Q 30/0272* (2013.01)

(58) Field of Classification Search
None
See application file for complete search history.

(56) References Cited

U.S. PATENT DOCUMENTS

| 7,826,376 B1* | 11/2010 | Kritov ................. H04L 43/0858 370/241 |
| 8,170,971 B1* | 5/2012 | Wilson ................... G06Q 30/02 706/46 |
| 2008/0139181 A1* | 6/2008 | Lokshin ................. G06Q 30/02 455/414.1 |
| 2015/0363757 A1* | 12/2015 | Mocko ................. G06Q 30/202 705/16 |
| 2017/0154356 A1* | 6/2017 | Trevisiol ............ G06Q 30/0246 |

* cited by examiner

*Primary Examiner* — Michael J Sittner
(74) *Attorney, Agent, or Firm* — Budzyn IP Law, LLC

(57) ABSTRACT

According to a first aspect of the invention, a computer-implemented method for determining an effectiveness of an electronic advertisement received at a user device is provided, the method including, at a server: receiving a notification message in response to the electronic advertisement being downloaded; generating a unique identifier and a time stamp in response to the download of the electronic advertisement, the unique identifier identifying the user device, and the time stamp identifying a time at which the electronic advertisement is downloaded; and receiving transaction data relating to a transaction initiated by the user using the downloaded electronic advertisement, the transaction data indicating the electronic advertisement has been used and including the unique identifier and the time stamp; determining the effectiveness of the electronic advertisement based on the transaction data and a relevance score of the user, the relevance score indicating the relevance of the electronic advertisement to the user.

6 Claims, 4 Drawing Sheets

METHOD AND APPARATUS FOR DETERMINING AN EFFECTIVENESS OF AN ELECTRONIC ADVERTISEMENT

TECHNICAL FIELD

The present disclosure relates to a method and an apparatus for determining an effectiveness of an electronic advertisement.

BACKGROUND

Predicting an effectiveness of an advertising campaign can be relatively inaccurate using current predictive models. These inaccuracies result, in part, from the difficulty of taking into account the effect of the advertisement campaign to every individual from the time that the advertisement campaign is sent or received to the time that a transaction occurs as a result of the advertisement campaign.

Further, current predicting models for advertising campaigns do not accurately reflect the media landscape and the individuals' responses. This in turn results in substantial time, effort and money being wasted on advertising campaigns. As such, there is a need for improvement.

In view of the above, it would be desirable to provide a method for determining an effectiveness of an electronic advertisement which overcomes one or more of the above disadvantages or which at least provides a useful alternative.

Furthermore, other desirable features and characteristics will become apparent from the subsequent detailed description and the appended claims, taken in conjunction with the accompanying drawings and this background of the disclosure.

SUMMARY

According to the first aspect of the invention, a computer-implemented method for determining an effectiveness of an electronic advertisement received at a user device is provided, the method comprising, at a server:
receiving a notification message in response to the electronic advertisement being downloaded at the user device;
generating a unique identifier and a time stamp in response to the download of the electronic advertisement, the unique identifier identifying the user device, and the time stamp identifying a time at which the electronic advertisement is downloaded; and
receiving transaction data relating to a transaction initiated by the user using the downloaded electronic advertisement, the transaction data indicating the electronic advertisement has been used and including the unique identifier and the time stamp; determining the effectiveness of the electronic advertisement based on the transaction data and a relevance score of the user, the relevance score indicating the relevance of the electronic advertisement to the user.

In an embodiment, the step of determining the effectiveness of the electronic advertisement comprises determining a transaction time period between the time, identified by the time stamp, at which the electronic advertisement is downloaded and a time at which the transaction is initiated by the user, wherein the relevance score indicates the relevance of the electronic advertisement to the user based on the determined transaction time period.

In an embodiment, the step of determining the effectiveness of the electronic advertisement comprises: determining an acknowledgement time period between (i) an acknowledgement time stamp at which the electronic advertisement is sent from the server to the user device and (ii) a time at which the transaction is initiated by the user, wherein the relevance score indicates the relevance of the electronic advertisement to the user based on the determined acknowledgement time period.

In an embodiment, the method further comprises determining a downloaded time period between the acknowledgement time stamp and the time, identified by the time stamp, at which the electronic advertisement is downloaded, wherein the relevance score indicates the relevance of the electronic advertisement to the user based on the determined downloaded time period.

In an embodiment, the method further comprises determining an effectiveness of the electronic advertisement to a further user via a further user device; ranking the users based on the relevance scores of the users, wherein the step of determining the effectiveness of the electronic advertisement comprises:
identifying profile characteristics of each of the users based on the transaction data in response to the ranked relevance scores.

In an embodiment, the electronic advertisement is an email.

According to the second aspect of the invention, an apparatus for determining an effectiveness of an electronic advertisement to a user via a user device is provided, the apparatus comprising: at least one processor; and
at least one memory including computer program code;
the at least one memory and the computer program code configured to, with at least one processor, cause the apparatus at least to:
receive a notification message in response the electronic advertisement being downloaded at the user device; generate an unique identifier and a time stamp in response to downloading the electronic advertisement, the unique identifier identifying the user device and the time stamp identifying a time at which the electronic advertisement is downloaded; and
receive transaction data when settling a transaction initiated by the user using the downloaded electronic advertisement, the transaction data indicating the electronic advertisement has been used and including the unique identifier and the time stamp;
determine the effectiveness of the electronic advertisement based on the transaction data and a relevance score of the user, the relevance score indicating the relevance of the electronic advertisement to the user, wherein the effectiveness of the electronic advertisement is further determined based on a relevance score of the user.

In an embodiment, the at least one memory and the computer program code is further configured with the at least one processor to:
determine a transaction time period between the time, identified by the time stamp, at which the electronic advertisement is downloaded and a time at which the transaction is initiated by the user,
wherein the relevance score indicates the relevance of the electronic advertisement to the user based on the determined transaction time period.

In an embodiment, the at least one memory and the computer program code is further configured with the at least one processor to:
determine an acknowledgement time period between (i) an acknowledgement time stamp at which the electronic advertisement is sent from the server to the user device and (ii) a time at which the transaction is initiated by the user, wherein the relevance score indicates the relevance of the electronic advertisement to the user based on the determined acknowledgement time period.

In an embodiment, wherein the at least one memory and the computer program code is further configured with the at least one processor to: determine a downloaded time period between the acknowledgement time stamp and the time, identified by the time stamp, at which the electronic advertisement is downloaded, wherein the relevance score indicates the relevance of the electronic advertisement to the user based on the determined downloaded time period.

In an embodiment, the transaction data identifies a mode of payment used to settle the transaction, the mode of payment comprising at least a cash payment.

According to a third aspect of the invention, a computer-readable storage medium is provided, the computer-readable storage medium having stored thereon computer program code which when executed by a computer causes the computer to execute a method in accordance with any one of the above.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

DETAILED DESCRIPTION

Figure 1:
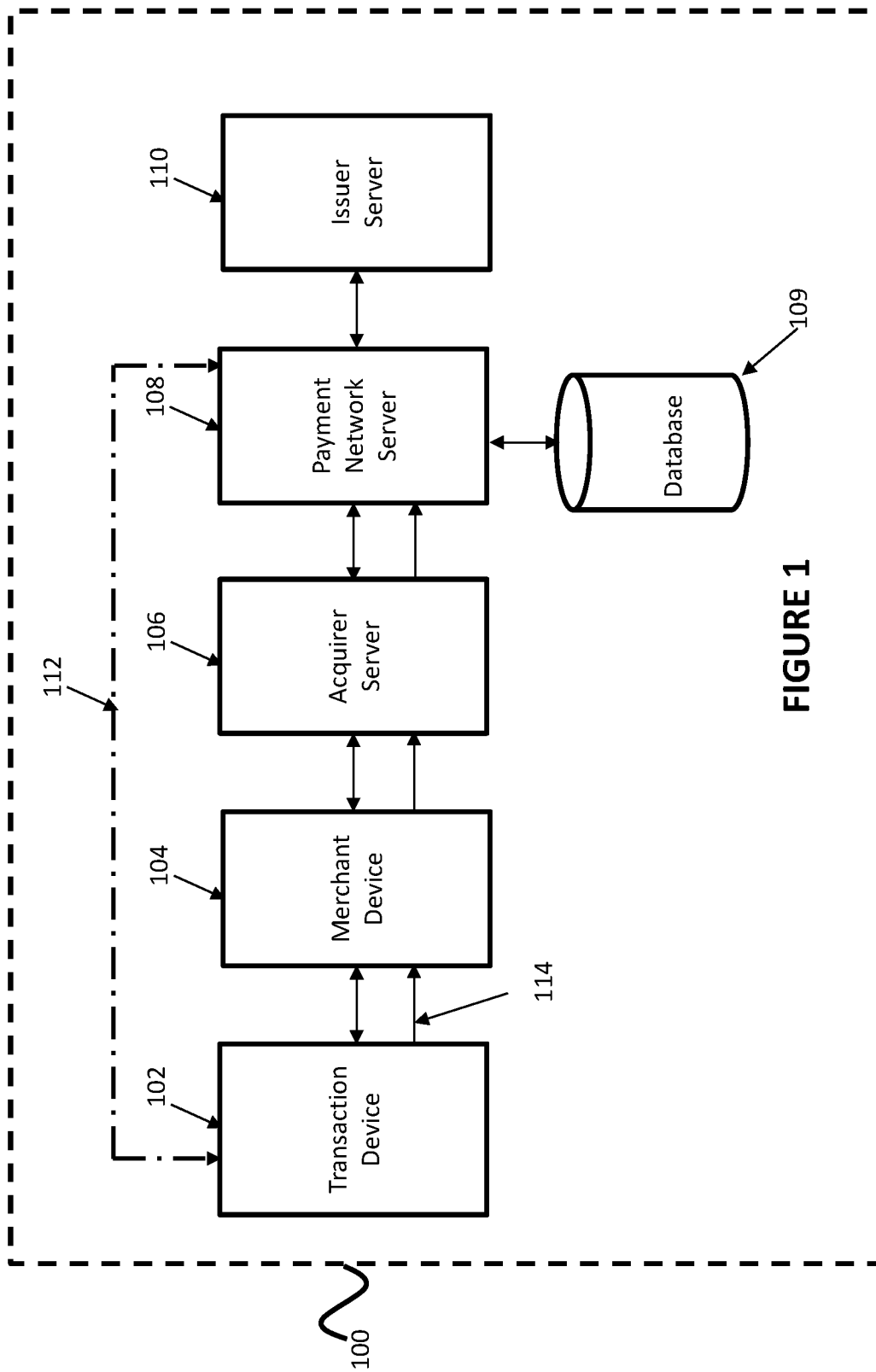
FIG. 1 depicts a block diagram of a transaction system for determining an effectiveness of an electronic advertisement.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "receiving", "retrieving", "identifying", "predicting", "sending", "updating", "completing" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Various embodiments relate to a method and an apparatus for determining an effectiveness of an electronic advertisement based on transaction data and a relevance score of a user. The relevance score indicates how relevant the electronic advertisement is to a user. In an embodiment, the method for determining an effectiveness of an electronic advertisement comprises generating a unique identifier and a time stamp which may be generated when an electronic advertisement is downloaded. The unique identifier and the time stamp may be included in transaction data when a transaction is initiated using the downloaded electronic advertisement as to determine the effectiveness of the electronic advertisement.

In the following description, an electronic advertisement may be a notice or announcement promoting a product, service, or event or publicizing a job vacancy. The electronic advertisement is so termed because it is transmitted via an electronic means which include, among other things, e-mail and website.

In an embodiment, a user may be a customer. In one example, the user may receive an electronic advertisement promoting a product, service, or event or publicizing a job vacancy by a merchant in his email. The user may decide to download the electronic advertisement so as to use the downloaded electronic advertisement to initiate a transaction. In an embodiment, the transaction is a payment transaction. In other words, completion of the transaction involves a payment between parties to the transaction.

FIG. 1 illustrates a block diagram of a system 100 within which transaction data can be received.

The system 100 comprises a user device 102 in communication with a merchant server 104. The user device 102 may also be in direct communication with a payment network server 108, without having to communicate with the merchant server 104. In specific embodiments, the user device 102 may also be in direct communication with a issuer device 110, without having to communicate with the merchant server 104 or the payment network server 108.

The merchant server 104 is in communication with the acquirer server 106. The acquirer server 106, in turn, is in communication with the payment network server 108. The payment network server 108, in turn, is in communication with the issuer device 110. In specific embodiments, the payment network server 108 may also be in direct communication with the user device 102.

Use of the term 'server' herein can mean a single computing device or a plurality of interconnected computing devices which operate together to perform a particular function. That is, the server may be contained within a single hardware unit or be distributed among several or many different hardware units.

The user device 102 typically is associated with a payer/customer who is a party to a transaction that occurs between the user device 102 and the merchant device 104 through a transaction. That is, the user device 102 may also be a transaction device. The user device 102 may be a fixed (wired) computing device or a wireless (portable) computing device. In specific implementations, the user device 102 may be a handheld or portable or mobile device carried or used by the customer, or may refer to other types of electronic devices such as a personal computer, a land-line telephone or an interactive voice response (IVR) system and the like. The mobile device may be a device, such as a mobile phone, a laptop computer, a personal digital computer (PDA), a mobile computer, a portable music player (such as an iPod™ and the like).

The merchant device 104 typically is associated with a payee/merchant who is also a party to the transaction that occurs between the user device 102 and the merchant device 104 through the transaction. In an embodiment, the merchant device 104 may also be associated with any one party who has an arrangement with the payer to execute a transaction between them. The merchant device 104 may be a point-of-sale (POS) terminal, an automatic teller machine (ATM), a personal computer, a computer server (hosting a website, for example), an IVR system, a land-line telephone, or any type of mobile device such as a mobile phone, a personal digital assistant (PDA), a laptop computer, a tablet computer and the like.

The acquirer server 106 generally is associated with an acquirer who may be an entity (e.g. a company or organization) which issues (e.g. establishes, manages, administers) a transaction credential or an account (e.g. a financial bank account) of the payee/merchant. An account of the payee/merchant may also be known as a payee account. Examples of the acquirer include a bank and/or other financial institution. As stated in the above, the acquirer server 106 may include one or more computing devices that are used to establish communication with another server by exchanging messages with and/or passing information to the other server.

Figure 4:
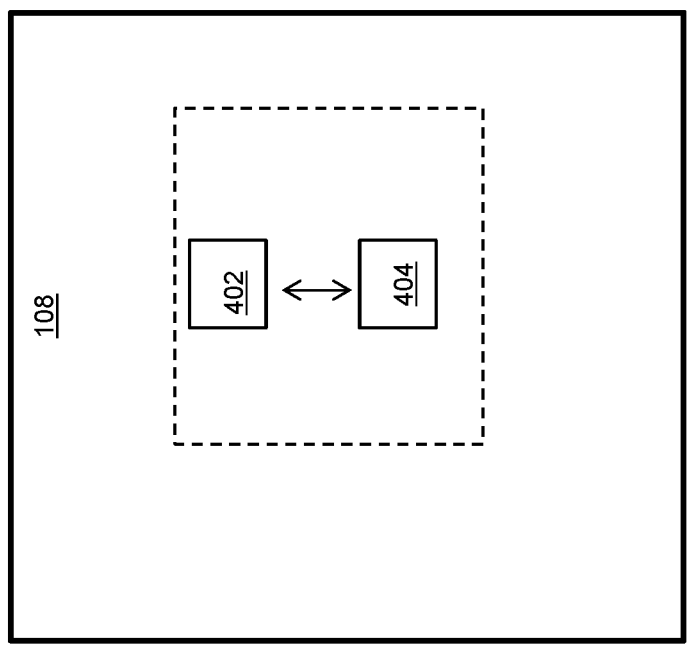
FIG. 4 depicts an exemplary computing device to realise a server for the payment network server 108 shown in FIG. 1.

The payment network server 108 typically is associated with a payment network. For example, the payment network server 108 may be part of the Banknet® network operated by MasterCard®. The payment network (e.g. MasterCard®) operates to process transactions, clear and settle funds for payments between two entities (e.g. two banks). The payment network server 108 may include one or more computing devices that are used for processing transactions. An exemplary payment network server 108 is shown in FIG. 4.

The issuer server 110 generally is associated with an issuer and may include one or more computing devices that are used to perform a payment transaction. The issuer may be an entity (e.g. a company or organization, such as a bank, a mobile network operator or a retailer) which issues (e.g. establishes, manages, administers) a transaction credential or an account (e.g. a financial bank account). An account, which may also be termed as a payer account, may be associated with a plurality of user devices 102.

The payment network server 108 may be configured to communicate with, or may include, a database (or a transaction database) 109. The transaction database 109 stores data corresponding to a transaction (or transaction data). Examples of the data include Transaction ID, Payee ID, Payer Name, Payee Name, Payee Country, Payee Address, Payee Postal Code. For example, data ("Payee name" or "Payee ID") relating to the payee, time and date for which the goods/services relating to the transaction will be delivered are included in the database 109. In some embodiments, the data also include payer data which identify a payer account and payee data which identify a payee account. In some embodiments, the payer account and the payee account are associated with corresponding accounts in the issuer server 110 and the acquirer server 106, respectively. In some embodiments, the data also comprise transaction history of the user and the merchant. Further details on how these data are utilised and managed are described in FIG. 2 below.

In a preferred embodiment, the user device 102 is capable of wireless communication using a suitable protocol with the issuer server 110. In some embodiments, the wireless communication comprises established telecommunication known in the art such as GSM, CDMA, WIFI or the like. In some embodiments, the wireless communication is established through the Internet via a website associated with the payment network server 108. That is, the payment network server 108 is able to send messages to the user device 102 and vice versa. In another embodiment, the user device 102 is capable of wireless communication using a suitable protocol with the merchant device 104. For example, embodiments may be implemented using user devices 102 that are capable of communicating with WiFi/Bluetooth-enabled merchant devices 104. It will be appreciated by a person skilled in the art that depending on the wireless communication protocol used, appropriate handshaking procedures may need to be carried out to establish communication between the user device 102 and the merchant device 104. For example, in the case of Bluetooth communication, discovery and pairing of the user device 102 and the merchant device 104 may be carried out to establish communication. In an example, during use, an electronic advertisement 112 may be sent to the user device 102 from the payment network server 108. The payment network server 108 may also generate an acknowledgement time stamp indicating that the electronic advertisement 112 is sent to the user device 102. The electronic advertisement 112 may be downloaded and in response to downloading the electronic advertisement, a notification message may be sent from the user device 102 to the payment network server 108, informing the payment network server 108 that the electronic advertisement 112 is downloaded.

In an example, during transaction, a transaction request 114 is generated at the user device 102. The transaction request 114 is generated by the user device 102 in response to the user (or customer) making a selection of goods and/or services to be purchased from the payee (or merchant) using the downloaded electronic advertisement. In other words, the transaction request 114 relates to a transaction between the user and the merchant. In a preferred embodiment, the user may have made arrangements/agreements with the merchant, resulting in the transaction request 114. In some embodiments, the user and the merchant are registered users of (i) accounts issued by a bank or financial institution and maintained at an issuer server 110 and (ii) accounts issued by a bank or financial institution and maintained at an acquirer server 106 respectively. Alternatively, the user and the merchant may be registered users of accounts issued directly with a payment network server 108. The transaction request 114 generated by the user device 102 may then be communicated to the payment network server 108 via the acquirer server 106. In another embodiment, the transaction request 114 may be communicated directly to the payment network server 108 without communicating the transaction request 114 via the acquirer server 106. In some embodiments, the transaction request 114 may be communicated by any means known to a person skilled in the art, for example wireless communications such as NFC, WIFI, Bluetooth, the public Internet or any other form of viable means of data communications. In yet another embodiment, the transaction may be performed via a website of the payee/merchant. In specific implementations, the user device 102 may be fitted with a wireless communications interface such as a Near Field Communication (NFC) interface to enable the user device 102 to electronically communicate with the merchant device 104 to perform the transaction. NFC is a set of standards to establish radio communication between devices by bringing them into close proximity such as only a few centimetres. NFC standards cover communication protocols and data exchange formats, and are based on radio-frequency identification (RFID) technology. Alternatively, infra-red technology may also be used.

In an embodiment, the transaction request 114 comprises corresponding transaction data relating to a transaction and identifies the payer and the payee, generally by way of identifiers each associated with the payer and the payee respectively. The transaction data also indicate an unique identifier and a time stamp which are generated when an electronic transaction is downloaded. That is, the transaction request 114 also comprises an indication of a period within which the transaction is initiated from the time that the electronic transaction is downloaded. In some embodiments, the transaction data comprises the name of the payer (or user), the name of the payee (or merchant), the names of a payer bank and a payee bank associated with the issuer server 110 and the acquirer server 106, respectively, and a payee bank account number. In some embodiments, the transaction data also comprise the payer bank's code and the payee bank's code which identify a bank, for example, Indian Financial System Code (IFSC), Bank Identifier Number (BIN), Society for Worldwide Interbank Financial Telecommunication (SWIFT) code, and International Bank Account Number (IBAN). In some embodiments, the transaction data also identify the goods and/or services to be purchased and a type or nature of the transaction. In some embodiments, the transaction data further identify a value or price of the goods and/or services (e.g., a transaction amount). In some embodiments, the transaction data also indicate a time and a date at which the transaction was initiated by the payer. In other embodiments, the transaction data may also indicate a mode of payment used by the payer to settle the transaction. The mode of payment includes at least one of a cash payment and a payment card payment.

The following types of transaction data may be included in the transaction request 114:

Transaction Level Information:—
Payer ID (anonymized)
Payee ID
Name of Payer
Name of Payee
Name of Payer Bank
Name of Payee Bank
Transaction Amount
Transaction Local Currency Amount
Date of Transaction
Time of Transaction
Type of Transaction
Date of Processing
Date to complete Transaction
Time to complete Transaction
Bank Codes (e.g. IFSC, BIN, SWIFT, IBAN etc)
Merchant Category Code (MCC)
Account (or Profile) Information:—
Account ID (anonymized)
Payer Bank Account Number
Payee Bank Account Number
Payee/Merchant Information:—
Payee/Merchant ID
Payee/Merchant Name
MCC/Industry Code
Industry Description
Payee/Merchant Country
Payee/Merchant Address
Payee/Merchant Postal Code
Payee/Merchant Acquirer Country
Payee/Merchant Acquirer ID
Issuer Information:—
Issuer ID
Issuer Name
Issuer Country In the preferred embodiment, the transaction request 114 is sent to the payment network 108 via the acquirer server 106. This maybe done via the Internet through an appropriate website associated with the acquirer server 106. In another embodiment, the transaction request 114 may be sent directly to the payment network server 108, without having to communicate through the acquirer server 106. This may be done via the Internet through an appropriate website associated directly with the payment network server 108. In yet another embodiment, the transaction request 114 is sent directly from the user device 102 to the merchant device 104. In an embodiment, for example, where the transaction is being performed at the website of the payee/merchant, the user device 102 and the payee/merchant device 104 are in communication with a network, such as, the Internet (not shown for the sake of simplicity). In an embodiment, the transaction request 114 is sent from the user device 102 to the merchant device 104 via the network.

As mentioned above, the role of the payment network server 108 is to facilitate communication between the acquirer server 106 and the issuer server 110. Therefore, the payment network server 108 may serve as a means through which the acquirer server 106 may communicate with the issuer server 110 in a manner that payments and authentication may be performed. In specific implementations, the payment network server 108 may receive transaction data when completing a transaction for a payer and subsequently store and/or update the transaction data in the database 109.

In specific implementations, the payment network server 108 is further configured to perform additional operations. For example, the payment network server 108 may be configured to determine an effectiveness of an electronic advertisement that may be sent to the user device 102. Once the electronic advertisement is downloaded at the user device 102, a notification message may be received at the payment network server 108 in response to the electronic advertisement being downloaded at the user device 102. The payment network server 108 may then generate an unique identifier identifying the user device 102 and a time stamp identifying the time at which the electronic advertisement is downloaded. The payment network server 108 may be configured to determine a relevance score which indicates the relevance of the electronic advertisement to the user. The payment network server 108 may be configured to determine a transaction time period between the time, identified by the time stamp, at which the electronic advertisement is downloaded and a time, identified by the transaction data, at which the transaction is initiated by the user. Also, the payment network server 108 may be configured to determine (i) an acknowledgement time period between an acknowledgement time stamp at which the electronic advertisement is sent from the server to the user device and a time at which the transaction is initiated by the user and/or (ii) a downloaded time period between the acknowledgement time stamp and the time, identified by the time stamp, at which the electronic advertisement is downloaded. The relevance score may be based on the determined (i) transaction time period and/or (ii) acknowledgement time period and/or (iii) downloaded time period.

The process to complete electronic transaction using the downloaded electronic transaction described above involves multiple parties (e.g., payer/user, payee/merchant, acquirer, issuer, payment facilitator). However, the electronic transaction may essentially be viewed as a transaction between a payer and a payee (with the other parties facilitating the transaction).

Figure 2:
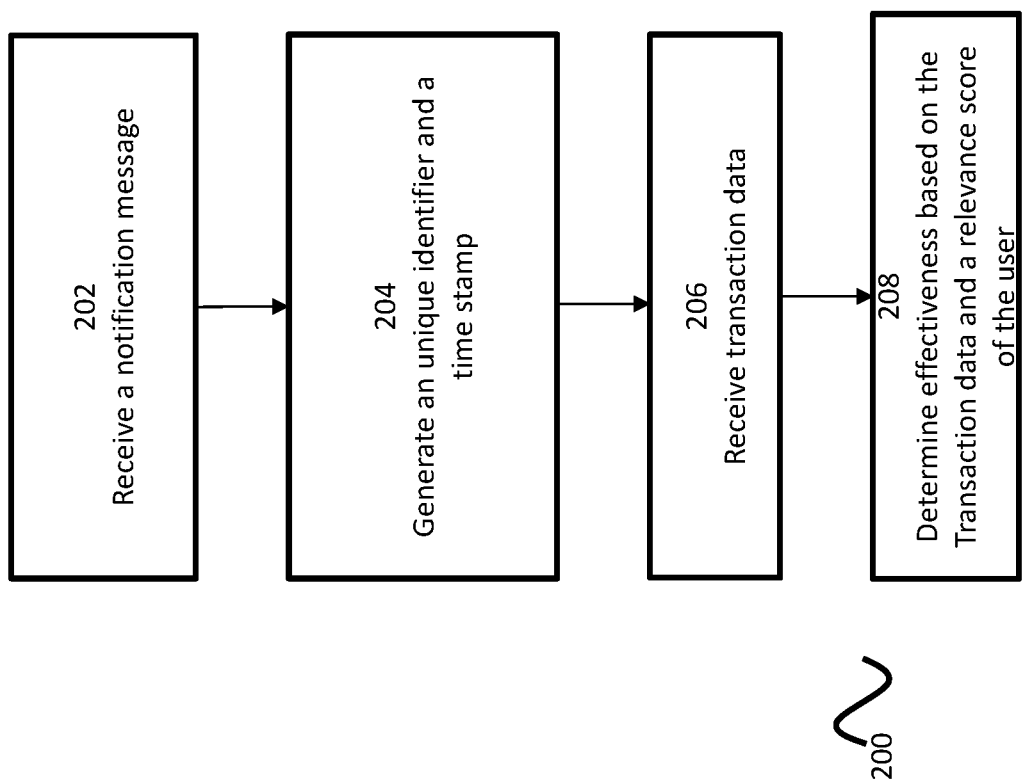
FIG. 2 depicts a flow chart of a method for determining an effectiveness of an electronic advertisement.

FIG. 2 shows a flow chart 200 illustrating a computer-implemented method for determining effectiveness of an electronic advertisement.

Referring to FIG. 2, at step 202, a notification message is received at the payment network server 108 when the electronic advertisement is downloaded at the user device 102. The electronic advertisement is one which is sent from the payment network server 108 to the user device 102. The notification message serves to inform the payment network server 108 that the electronic advertisement has been downloaded.

At step 204, a unique identifier and a time stamp are generated in response to downloading the electronic advertisement. The unique identifier identifies the user device which may be associated with the user by registration and a time stamp identifying a time at which the electronic advertisement is downloaded. In other words, the unique identifier may also be used to identify the user.

At step 206, a transaction request 114 is received by the payment network server 108. That is, the transaction request 114 is generated when the user (or payer) initiates an electronic transaction when he wants to purchase a good and/or service using the downloaded electronic transaction. The transaction request 114 includes payer data that identifies the payer account. In an embodiment, the transaction request 114 is initiated by the payer via the user device 102 to the payment network server 108. In an embodiment, the transaction request 114 can be sent by the user device 102 to the payment network server 108 via the acquirer server 106. In another embodiment, the transaction request 114 can be sent by the user device 102 to the payment network server 108 directly without communicating the transaction request 114 via the acquirer server 106. In an embodiment, the transaction request 114 comprises payer data identifying the payer account and payee data identifying the payee account. In some embodiments, the transaction request 114 comprises at least the unique identifier, the time stamp, the name of the payee, the name of the payer bank associated with the issuer server 110, the name of the payee bank associated with the acquirer server 106, the payee bank account number, the bank codes for the payer bank and the payee bank, the date to complete the limited-time delayed electronic transaction, and the transaction amount.

At step 204, after the payment network server 108 has received the transaction request 114 from the payer, the payment network server 108 is configured to determine the effectiveness of the electronic advertisement based on the transaction data and a relevance score of the user. The relevance score indicates the relevance of the electronic advertisement to the user. In some embodiments, the payment network server 108 is configured to check a time, identified by the transaction data, at which the transaction is initiated by the user and determine a transaction time period which refers to the time, identified by the time stamp, at which the electronic advertisement is downloaded and the time, identified by the transaction data, at which the transaction is initiated by the user. That is, if the payment network server 108 determines a short transaction time period, a higher relevance score may be determined indicating that the electronic advertisement is highly relevant to the user. The transaction time period reflects how long it takes for the user to initiate a transaction from the time that the electronic advertisement is downloaded to the user device 102 from the payment network server 108 to the user device. In other words, the electronic advertisement is very effective in causing transactions to occur. Conversely, if the payment network server 108 determines a long transaction time period, a low relevance score may be determined indicating that the electronic advertisement is not so relevant to the user. In other words, the electronic advertisement is not so effective in causing transactions to occur.

In some embodiments, the payment network server 108 is configured to determine an acknowledgement time period between an acknowledgement time stamp at which the electronic advertisement is sent from the server to the user device and a time at which the transaction is initiated by the user. That is, if the payment network server 108 determines a short acknowledgement time period, a higher relevance score may be determined indicating that the electronic advertisement is highly relevant to the user. The acknowledgement time period reflects how long it takes for the user to initiate a transaction from the time that the electronic advertisement is sent from the payment network server 108 to the user device. In other words, the electronic advertisement is very effective in causing transactions to occur if there is a short acknowledgement time period. Conversely, if the payment network server 108 determines a long acknowledgement time period, a low relevance score may be determined indicating that the electronic advertisement is not so relevant to the user. In other words, the electronic advertisement is not so effective in causing transactions to occur.

Additionally or alternatively, in some embodiments, the payment network server 108 is configured to determine a downloaded time period between the acknowledgement time stamp and the time, identified by the time stamp, at which the electronic advertisement is downloaded, That is, if the payment network server 108 determines a short downloaded time period, a higher relevance score may be determined indicating that the electronic advertisement is highly relevant to the user. The downloaded time period reflects how long it takes for the user to download the electronic advertisement from the time that the electronic advertisement is sent from the payment network server 108 to the user device. In other words, the electronic advertisement is very effective in convincing the user to download an electronic advertisement if there is a short downloaded time period. Conversely, if the payment network server 108 determines a long downloaded time period, a low relevance score may be determined indicating that the electronic advertisement is not so relevant to the user. In other words, the electronic advertisement is not so effective in causing electronic advertisements to be downloaded. For the above determination of the (i) transaction time period and/or the (ii) acknowledgement time period and/or the (iii) downloaded time period, it may be performed by comparing each of the determined time period against a predetermined time period in order to determine if the subject time period is long or short. Additionally or alternatively, the determination step may also be performed by comparing each of the determined time periods against another time period in order to determine if the subject time period is long or short.

In an example, the payment network server 108 is configured to determine effectiveness of the same electronic advertisement for a further user (e.g., another user) and rank the users based on the relevance scores. The profile characteristics of each of the users may then be identified based on the transaction data which includes details of the user. In this manner, it is possible to identify profile characteristics of the user for which the electronic advertisement is more effective and similar electronic advertisements may then be sent to users having similar profile characteristics.

Additionally, the payment network server 108 may be configured to update the database 112 when completing a current transaction. This helps to keep the transaction data relevant and updated. The payment network server 108 may also be configured to update the database 109 when a payer or a payee registers an account at the payment network server 108 or when a payer or a payee registers an account with a bank or a financial institution associated with an issuer server 110 or a bank or a financial institution associated with an acquirer server 106 respectively.

Advantageously, the payment network server 108 may be configured to determine how effective an electronic transaction is to a targeted user. Furthermore, since the advertisement is unique and mapped to one user, it is made possible to determine which electronic means is more effective in distributing the electronic transaction to the targeted user. From the user's perspective, the electronic advertisement allows him to save and use the electronic transaction unique to him. This way, it also allows the user to increase interaction in utilizing the electronic advertisement.

Figure 3:
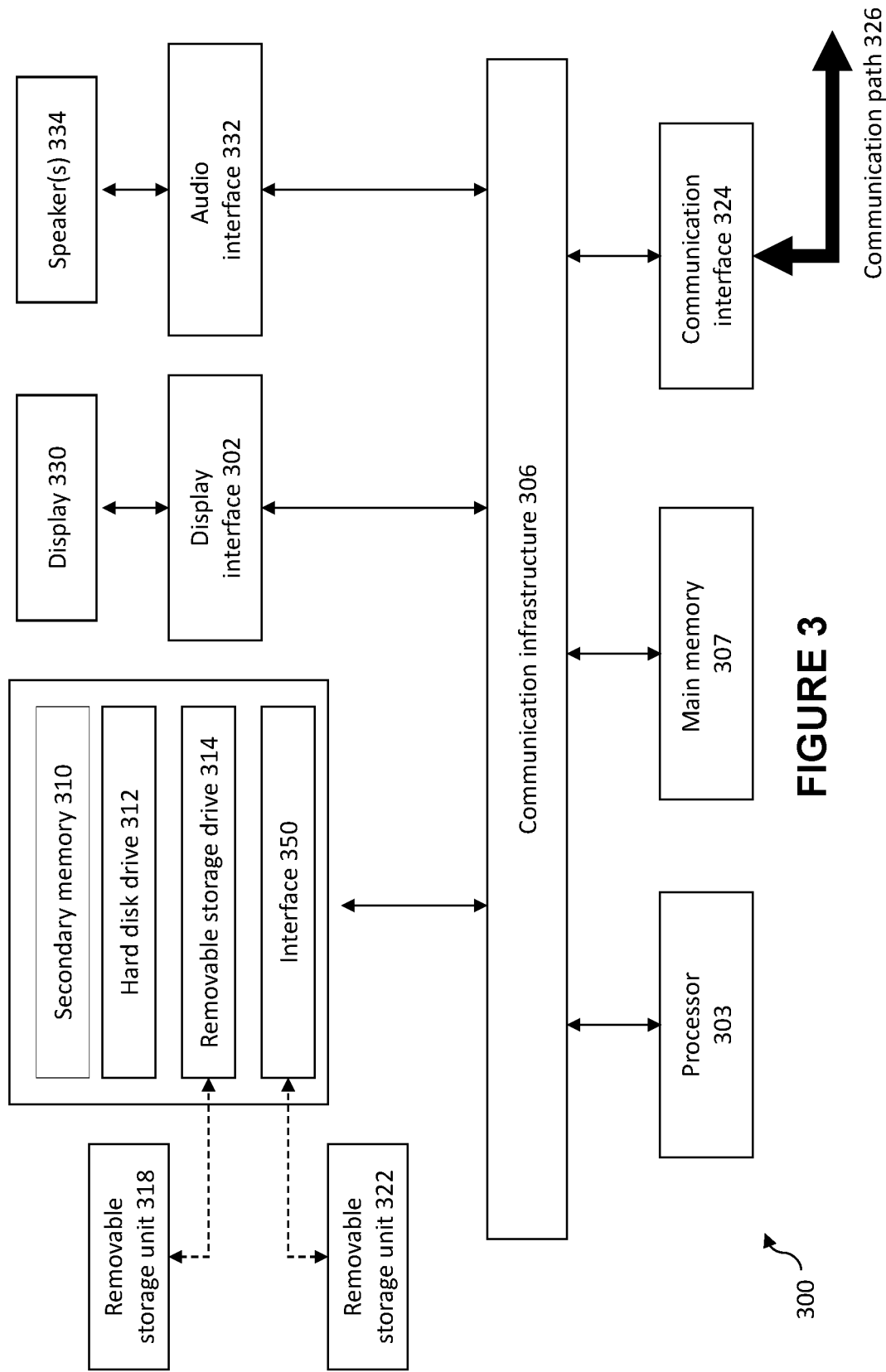
FIG. 3 depicts a schematic diagram of a computer system suitable for use in executing the methods depicted in FIG. 2.

FIG. 3 depicts an exemplary computer/computing device 300, hereinafter interchangeably referred to as a computer system 300, where one or more such computing devices 300 may be used to facilitate execution of the above-described method for determining an effectiveness of an electronic advertisement. In addition, one or more components of the computer system 300 may be used to realize the computer 302. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a storage drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage medium 344 in a well-known manner. The removable storage medium 344 may include magnetic tape, optical disk, non-volatile memory storage medium, or the like, which is read by and written to by removable storage drive 314. As will be appreciated by persons skilled in the relevant art(s), the removable storage medium 344 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 340. Examples of a removable storage unit 322 and interface 340 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 322 and interfaces 340 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port (such as a serial, parallel, printer, GPIB, IEEE 1393, RJ35, USB), an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage medium 344, removable storage unit 322, a hard disk installed in storage drive 312, or a carrier wave carrying software over communication path 326 (wireless link or cable) to communication interface 324. Computer readable storage media refers to any non-transitory, non-volatile tangible storage medium that provides recorded instructions and/or data to the computing device 300 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the storage drive 312, or the interface 340. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

In an implementation, the payment network server 108 may be generally described as a physical device comprising at least one processor 402 and at least one memory 404 including computer program code. The at least one memory 404 and the computer program code are configured to, with the at least one processor 402, cause the physical device to perform the operations described in FIG. 2. An example of the payment network server 108 is shown in FIG. 4.

For example, the method of FIG. 2 may be implemented as software and stored in a non-transitory fashion in the secondary memory 310 or the removable storage units 318, 322 of the computer device 300.

It will be appreciated by a person skilled in the art that numerous variations and/or modifications may be made to the present invention as shown in the specific embodiments without departing from the spirit or scope of the invention as broadly described. For example, the above description mainly discusses the use of a Bluetooth connection, but it will be appreciated that another type of secure wireless connection, such as Wi-Fi, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

What is claimed:

1. A computer-implemented method for determining an effectiveness of an electronic advertisement, the method comprising, at a server:
   i. sending an electronic communication to a user device associated with a user, the electronic communication including downloadable access to the electronic advertisement;
   ii. generating an acknowledgement time stamp identifying at which time the electronic communication was sent to the user device;
   iii. receiving a notification message, generated by the user device, in response to the electronic advertisement being downloaded at the user device;
   iv. generating a unique identifier and a download time stamp in response to the download of the electronic advertisement, the unique identifier identifying the user device, and the download time stamp identifying a time at which the electronic advertisement was downloaded;
   v. receiving transaction data relating to a transaction initiated by the user using the downloaded electronic advertisement, the transaction data indicating the electronic advertisement has been used to initiate the transaction and including the unique identifier and a transaction time stamp identifying when the transaction was initiated by the user using the downloaded electronic advertisement, wherein the transaction data includes one or more of: a merchant category code, an industry code, and, merchant information;
   vi. determining a first component of a relevance score of the electronic advertisement for the user based on comparing a first predetermined time period against a first time period between the acknowledgement time stamp and the download time stamp, wherein, with the first time period being less than the first predetermined time period, the first component is assigned a positive score, wherein, with the first time period being greater than the first predetermined time period, the first component is assigned a negative score, and, wherein, the positive score is higher than the negative score;
   vii. determining a second component of the relevance score of the electronic advertisement for the user based on comparing a second predetermined time period against a second time period between the download time stamp and the transaction time stamp, wherein, with the second time period being less than the second predetermined time period, the second component is assigned a secondary positive score, wherein, with the second time period being greater than the second predetermined time period, the second component is assigned a secondary negative score, and, wherein, the secondary positive score is greater than the secondary negative score;

viii. combining the first and second components in determining the relevance score;

repeating steps i.-viii. for a plurality of users;

ranking the users based on the relevance scores to identify high ranking users having relevance scores above a determined threshold;

identifying profile characteristics of the high ranking users based on the transaction data associated with the high ranking users, wherein the profile characteristics including, for each of the high ranking users, one or more of: the merchant category codes, the industry codes, and, the merchant information;

identifying candidate users having similar profile characteristics to the identified profile characteristics of the high ranking users based on merchant categories, industry codes, and merchant information of transactions completed by the candidate users;

storing on a database, an association of each of the identified candidate users, the respective identified similar profile characteristics, and a mode of electronically delivering electronic advertisements to the respective candidate user; and identifying electronic advertisements similar to the electronic advertisement, based on similarity of the identified profile characteristics of the users and the identified similar profile characteristics of the candidate users, for sending to the candidate users via the stored modes of electronically delivering electronic advertisements.

2. The method according to claim 1, wherein the electronic communication is an email.

3. The method according to claim 1, wherein the transaction data identifies a mode of payment used to settle the transaction, the mode of payment comprising at least a cash payment.

4. An apparatus for determining an effectiveness of an electronic advertisement, the apparatus comprising:

at least one processor; and at least one memory including computer program code;

the at least one memory and the computer program code configured to, with at least one processor, cause the apparatus at least to:

i. send an electronic communication to a user device associated with a user, the electronic communication including downloadable access to the electronic advertisement;

ii. generate an acknowledgement time stamp identifying at which time the electronic communication was sent to the user device;

iii. receive a notification message, generated by the user device, in response to the electronic advertisement being downloaded at the user device;

iv. generate an unique identifier and a download time stamp in response to the download of the electronic advertisement, the unique identifier identifying the user device and the download time stamp identifying a time at which the electronic advertisement was downloaded;

v. receive transaction data when settling a transaction initiated by the user using the downloaded electronic advertisement, the transaction data indicating the electronic advertisement has been used to initiate the transaction and including the unique identifier and a transaction time stamp identifying when the transaction was initiated by the user using the downloaded electronic advertisement, wherein the transaction data includes one or more of: a merchant category code, an industry code, and, merchant information;

vi. determine a first component of a relevance score of the electronic advertisement for the user based on comparing a first predetermined time period against a first time period between the acknowledgement time stamp and the download time stamp, wherein, with the first time period being less than the first predetermined time period, the first component is assigned a positive score, wherein, with the first time period being greater than the first predetermined time period, the first component is assigned a negative score, and, wherein, the positive score is higher than the negative score;

vii. determine a second component of the relevance score of the electronic advertisement for the user based on comparing a second predetermined time period against a second time period between the download time stamp and the transaction time stamp, wherein, with the second time period being less than the second predetermined time period, the second component is assigned a secondary positive score, wherein, with the second time period being greater than the second predetermined time period, the second component is assigned a secondary negative score, and, wherein, the secondary positive score is greater than the secondary negative score;

viii. combine the first and second components in determining the relevance score;

repeat steps i.-viii. for a plurality of users;

rank the users based on the relevance scores to identify high ranking users having relevance scores above a determined threshold;

identify profile characteristics of the high ranking users based on the transaction data associated with the high ranking users, wherein the profile characteristics including, for each of the high ranking users, one or more of: the merchant category codes, the industry codes, and, the merchant information;

identify candidate users having similar profile characteristics to the identified profile characteristics of the high ranking users based on merchant categories, industry codes, and merchant information of transactions completed by the candidate users;

store on a database, an association of each of the identified candidate users, the respective identified similar profile characteristics, and a mode of electronically delivering electronic advertisements to the respective candidate user; and identify electronic advertisements similar to the electronic advertisement, based on similarity of the identified profile characteristics of the users and the identified similar profile characteristics of the candidate users, for sending to the candidate users via the stored modes of electronically delivering electronic advertisements.

5. The apparatus according to claim 4, wherein the electronic communication is an email.

6. The apparatus according to claim 4, wherein the transaction data identifies a mode of payment used to settle the transaction, the mode of payment comprising at least a cash payment.

* * * * *